(12) United States Patent
Cavalancia, II

(10) Patent No.: US 8,229,962 B1
(45) Date of Patent: Jul. 24, 2012

(54) LOCATION-AWARE TASK MANAGEMENT SYSTEMS AND METHODS

(75) Inventor: Nicholas John Cavalancia, II, Plantations, FL (US)

(73) Assignee: Quest Software, Inc., Aliso Viejo, CA (US)

( * ) Notice: Subject to any disclaimer, the term of this patent is extended or adjusted under 35 U.S.C. 154(b) by 151 days.

(21) Appl. No.: 12/906,653

(22) Filed: Oct. 18, 2010

Related U.S. Application Data

(60) Provisional application No. 61/252,844, filed on Oct. 19, 2009.

(51) Int. Cl.
*G06F 17/30* (2006.01)
(52) U.S. Cl. ........ 707/791; 707/706; 707/736; 707/758; 707/781; 707/802
(58) Field of Classification Search ........... 707/600–899
See application file for complete search history.

(56) References Cited

U.S. PATENT DOCUMENTS

| | | | |
|---|---|---|---|
| 7,388,491 B2 | 6/2008 | Chand et al. | |
| 7,536,695 B2 | 5/2009 | Alam et al. | |
| 2003/0061084 A1 | 3/2003 | Menninger | |
| 2006/0095912 A1* | 5/2006 | Wood-Gaines et al. | 718/100 |
| 2010/0197325 A1 | 8/2010 | Dredge | |

* cited by examiner

*Primary Examiner* — Isaac M Woo
(74) *Attorney, Agent, or Firm* — Knobbe Martens Olson & Bear, LLP

(57) ABSTRACT

Location-aware task management solutions are disclosed that can be used in a variety of task-management applications that prioritize tasks associated with a plurality of remote locations, based at least in part on the location of the remote user. For instance, certain systems utilize media access control (MAC) addresses of a plurality of wireless access points (WAPs) to identify and/or recommend which of a plurality of tasks should be completed by one or more remote users responsible for completing the tasks. In other instances, certain systems utilize GPS or RFID information to identify and/or recommend which of a plurality of tasks should be completed by one or more remote users responsible for completing the tasks.

14 Claims, 7 Drawing Sheets

US 8,229,962 B1

LOCATION-AWARE TASK MANAGEMENT SYSTEMS AND METHODS

CROSS-REFERENCE TO RELATED APPLICATIONS

This application claims the benefit of priority under 35 U.S.C. §119(e) of U.S. Provisional Patent Application No. 61/252,844, filed on Oct. 19, 2009 and titled "Location-Aware Task Management Systems and Methods," the entirety of which is hereby incorporated herein by reference to be considered part of this specification.

BACKGROUND

Embodiments generally relate to task management systems and methods that utilize location information for completing and/or prioritizing one or more tasks. In particular, embodiments relate to dynamically reprioritizing an information technology (IT) help desk assigned task list based, at least in part, on location information.

As more and more companies rely on computers, the information technology (IT) help desk plays a key role in maintaining employee productivity in increasingly complex IT environments. The help desk not only logs and resolves routine incidents, but also becomes the front end for all complaints, change requests, and any other issues IT end-users might have. When IT end-users' open issues are not addressed in a timely and efficient manner, employee productivity decreases.

SUMMARY

Systems and methods disclosed herein can be used in a variety of task-management applications to complete and/or prioritize tasks associated with a plurality of remote locations. For instance, certain embodiments utilize media access control (MAC) addresses of a plurality of wireless access points (WAPs) to identify and/or recommend which of a plurality of tasks should be completed by one or more remote users responsible for completing the tasks.

In certain embodiments, method of dynamically reprioritizing an information technology (IT) task database is disclosed. The method comprises receiving from a server a wireless access point (WAP) database, where the WAP database comprises at least one access address. The at least one access address is associated with at least one first location. The method further comprises receiving from the server a task database, where the task database comprises at least one task. The at least one task is assigned to the task database by an IT administrator and the at least one assigned task has a first priority and is associated with a physical location. The method further comprises connecting to a WAP at a current location, identifying an access address associated with the WAP at the current location, transforming the current location access address into the at least one assigned task, and reprioritizing the assigned tasks in the task database based at least in part on the current location, where the reprioritized task database comprises the at least one assigned task. The at least one assigned task has a second priority, and the second priority is different from the first priority.

In certain embodiments the access address comprises a media access control (MAC) address, identifying an access address associated with the WAP at the current location comprises identifying a MAC address associated with the WAP at the current location, and transforming the current location access address into the at least one assigned task comprises transforming the current location MAC address into the at least one assigned task.

In certain embodiments, transforming the current location MAC address into the at least one assigned task comprises using the current location MAC address as the at least one access address in the WAP database, identifying the at least one first location using the WAP database and the current location MAC address, using the at least one first location as the physical address associated with the at least one assigned task in the assigned task database, and identifying the at least one assigned task using the task database and the at least one first location.

In certain embodiments, a computer readable storage medium comprising computer executable instructions configured to implement a method of dynamically reprioritizing an information technology (IT) task database is disclosed. The method comprises receiving from a server a wireless access point (WAP) database, where the WAP database comprises at least one access address. The at least one access address is associated with at least one first location. The method further comprises receiving from the server a task database, where the task database comprises at least one task. The at least one task is assigned to the task database by an IT administrator, and the at least one assigned task has a first priority and is associated with a physical location. The method further comprises connecting to a WAP at a current location, identifying an access address associated with the WAP at the current location, transforming the current location access address into the at least one assigned task, and reprioritizing the assigned tasks in the task database based at least in part on the current location, where the reprioritized task database comprises the at least one assigned task. The at least one assigned task has a second priority, and the second priority is different from the first priority.

In certain embodiments, a system for dynamically reprioritizing an information technology (IT) task database is disclosed. The system comprises an IT server and the IT server comprises a first computer processor and a first task management module. The first task management module is configured to receive from an IT administrator task data indicative of at least one task and a physical location associated with the at least one task, and transform the task data into task database. The IT task database comprises the at least one task, the physical location associated with the at least one task, and a first priority associated with the at least one task. The first task management module is further configured to receive wireless access point (WAP) data indicative of at least one access address and at least one first location associated with the at least one access address, and transform the WAP data into a WAP database. The WAP database comprising the at least one access address and the at least one first location associated with the at least one access address.

The system further comprises a computing device and the computing device comprises a second computer processor and a second task management module. The second task management module is configured to receive location information, receive the task database and the WAP database from the IT server, and transform the task database into a reprioritized task list. The reprioritized task list comprises the at least one task, the physical location associated with the at least one task, and a second priority, where the second priority is different from the first priority and where the second priority based at least in part on the location information.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers are re-used to indicate correspondence between referenced elements. The drawings, associated descriptions, and specific implementation are provided to illustrate embodiments of the invention and not to limit the scope of the disclosure.

DETAILED DESCRIPTION OF THE PREFERRED EMBODIMENT

An issue tracking system, trouble ticket system, support ticket, or incident ticket system can be a software program that maintains lists of issues as needed by organizations. The issue tracking system can be used to create, update and resolve reported customer issues. A ticket is a file contained within an issue tracking system which contains information about an incident reported by an end user.

An IT department may receive complaints, requests and other issues IT end-users might have and may issue tickets to identify the issue for resolution. IT department tickets can contain information about support interventions made by the help desk staff on behalf of end-users who report incidents that prevent them from working on their computers. The IT help desk staff are dispatched to resolve the end-users' IT issues.

In certain embodiments, location-aware task management systems and methods are used in an IT help desk environment to enable help desk staff to manage and/or prioritize end-user issues in a more efficient manner. For example, remote help desk users or administrators can be equipped with a ticket tracking mechanism (e.g., such as a client application on portable computing device) so that end-users' open issues can be addressed in a timely manner, and productivity levels remain in line with business objectives. Moreover, such end-user issues can be further prioritized based on location information and/or priority information associated with the location of the open issue(s), such as by utilizing WAP MAC address information. As an example, certain embodiments can be integrated with the HELP DESK AUTHORITY help desk software solution commercially available from Script-Logic Corporation (Boca Raton, Fla.).

The features of the inventive systems and methods will now be described with reference to the drawings summarized above.

Figure 1:
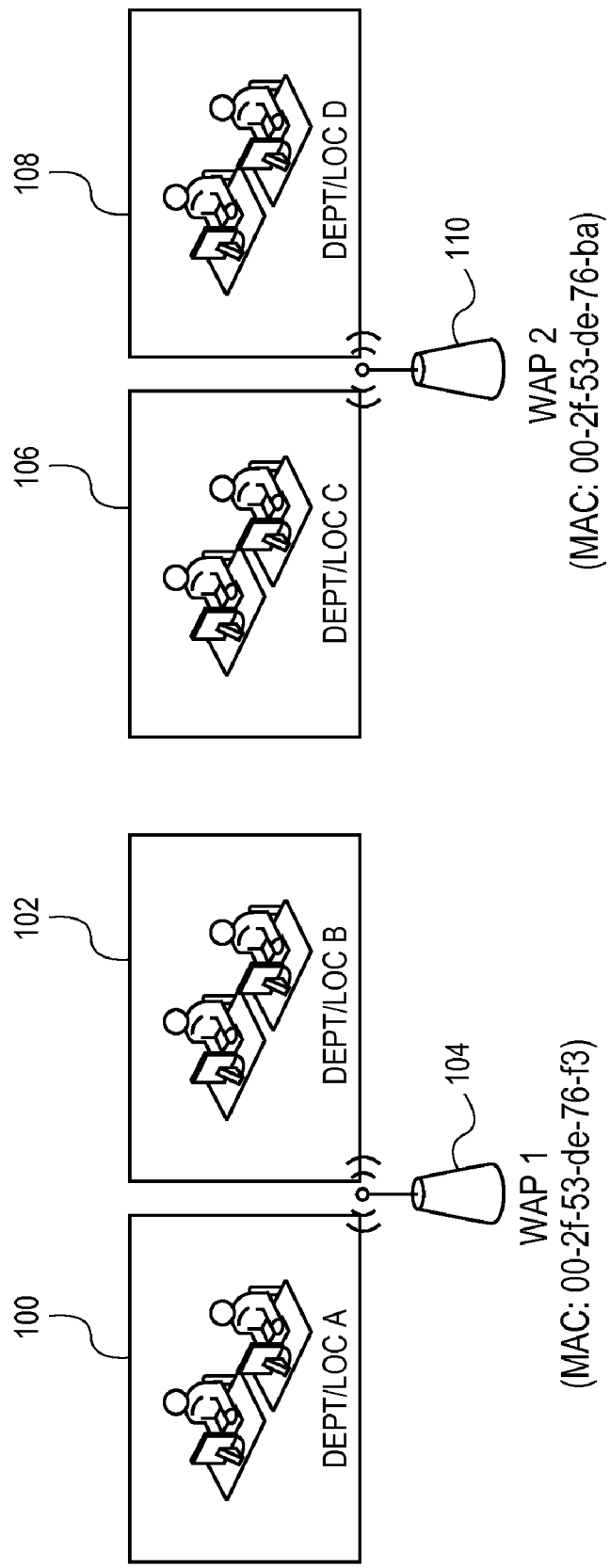
FIG. 1 illustrates departments or locations in wireless communication with a WAP, according to certain embodiments.

FIG. 1 illustrates departments or locations in wireless communication with WAPs, according to certain embodiments. Each WAP is associated with a unique MAC address. As shown in FIG. 1, both a department or location A 100 and a department or location B 102 are in wireless communication with a first WAP 104 having a unique MAC address 00-2f-53-de-76-f3. In certain embodiments, the department or location 100, 102 can comprise a physical location and/or a location defined at least in part by the signal strength of the first WAP 104. In yet other embodiments, the department or location 100, 102 are defined by those machines and/or users (e.g., group of users) that are authorized to access the first WAP 104. For instance, the department or location can comprise one or more rooms, buildings, floors, areas, groups, cities or any other geographically separate location, combinations of the same or the like.

In yet other embodiments, one or more of the end-users and/or devices of particular locations/departments 100, 102 do not need to be in wireless communication with their associated WAP 104. Rather, the associated WAP 104 can be one that is merely in closest proximity to the location/department 100, 102, and such location/department end-users can be coupled to one or more other networks, such as a local area network, via wired or wireless communication without accessing the first WAP 104. In such embodiments, the first WAP 104 is used as a means of identifying the relative physical location of the department 100, 102.

Likewise, as also shown in FIG. 1, both a department or location C 106 and a department or location D 108 are in communication with and/or associated with a second WAP 110 having a unique MAC address 00-2f-53-de-76-ba.

Figure 2:
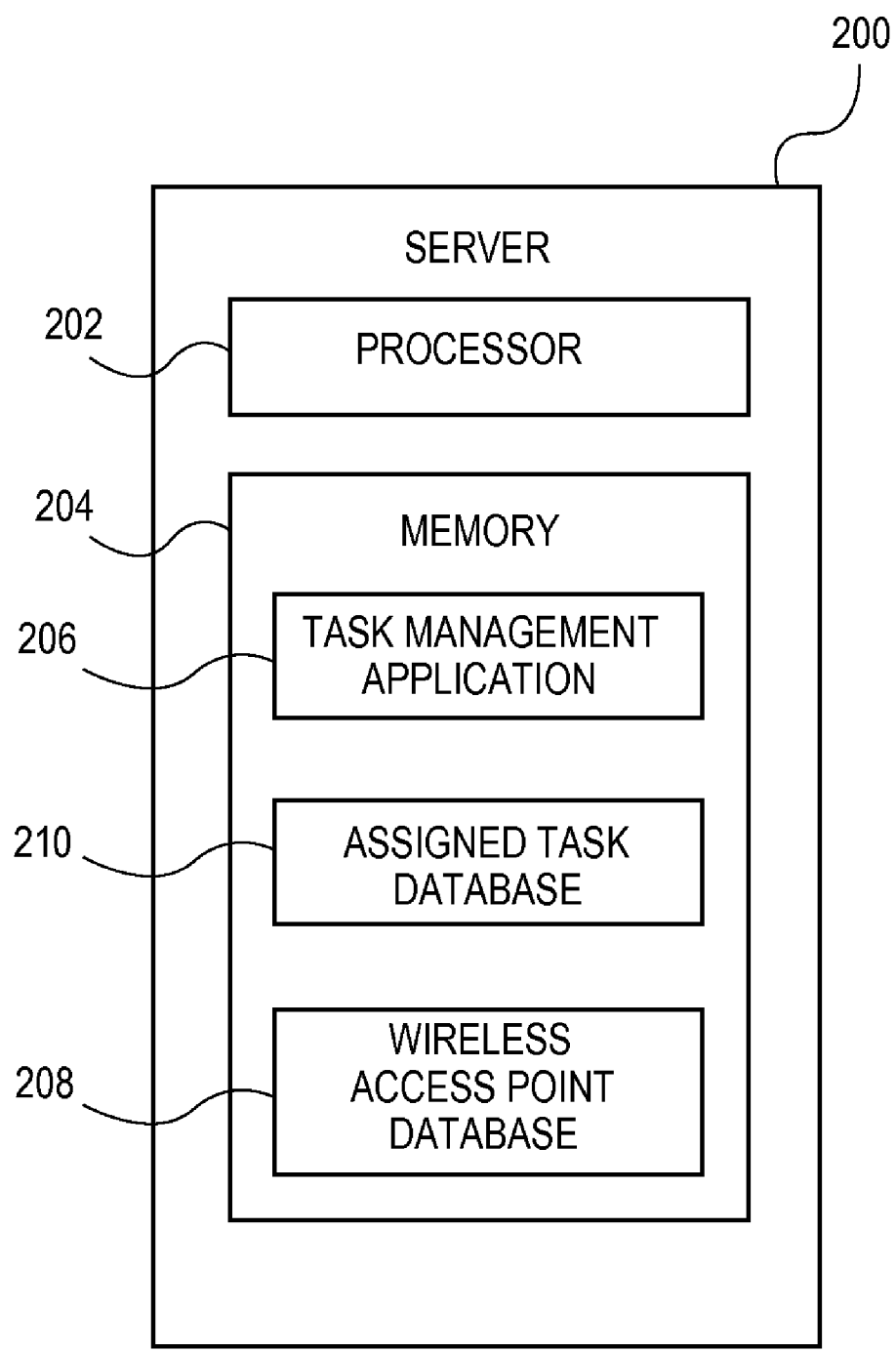
FIG. 2 illustrates a block diagram of an embodiment of an IT server.

FIG. 2 illustrates a block diagram of an embodiment of a server 200, such as, for example, an IT help desk server 200. The server comprises one or more computers 202 and memory 204. The computers 202 comprise, by way of example, processors, program logic, or other substrate configurations representing data and instructions, which operate as described herein. In other embodiments, the processors can comprise controller circuitry, processor circuitry, processors, general-purpose single-chip or multi-chip microprocessors, digital signal processors, embedded microprocessors, microcontrollers and the like.

The memory 204 can comprise one or more logical and/or physical data storage systems for storing data and applications used by the server 200. In an embodiment, the memory 204 comprises a task management application 206, a WAP database 208, and an assigned task database 210.

In certain embodiments, locations within an organization are mapped to a specific WAP based on the WAP's unique MAC address and are stored within the WAP database 208 for later retrieval. As illustrated in FIG. 2, in certain embodiments, the WAP database 208 is stored on the server 200 that hosts the task management application 206.

Figure 3:
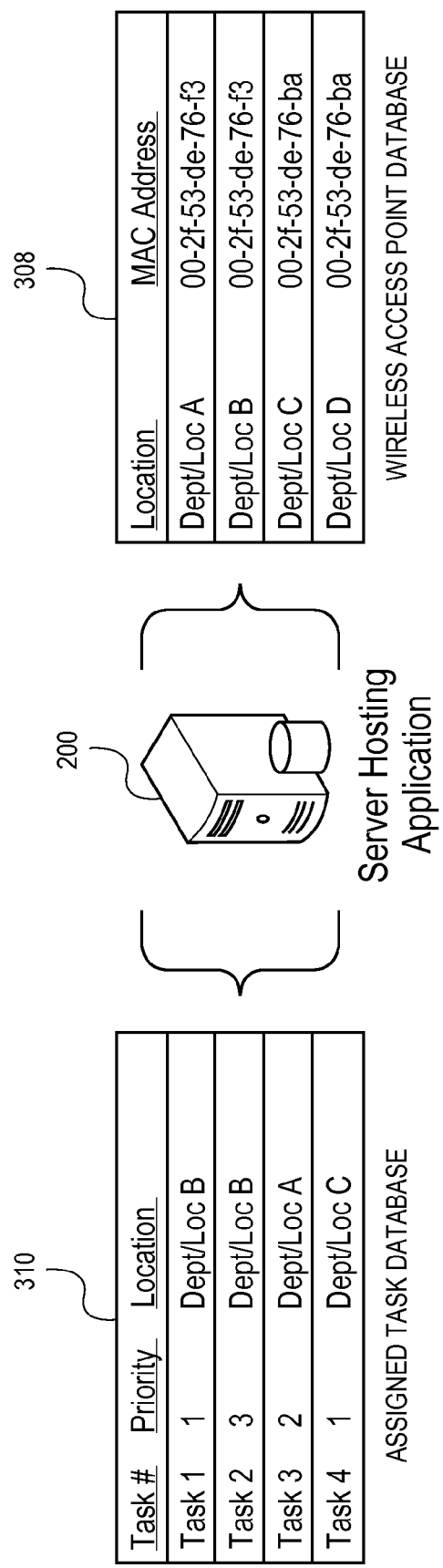
FIG. 3 illustrates an exemplary WAP database and an exemplary IT task database associated with an IT server, according to certain embodiments.

FIG. 3 illustrates an exemplary WAP database 308 stored on the IT help desk server 200, according to certain embodiments. The WAP database 308 identifies each department/location 100, 102, 106, 108 and the MAC address of the WAP 104, 110 associated with the specific department/location 100, 102, 106, 108. For example, the WAP database 308 identifies department/location A 100 and department/location B 102 with the MAC address 00-2f-53-de-76-f3 of the first WAP 104. Further, the WAP database 308 identifies department/location C 106 and department/location D 108 with MAC address 00-2f-53-de-76-ba of the second WAP 110.

In certain embodiments, this mapping of the location/department 100, 102, 106, 108 can be performed automatically and/or generated manually by a user at a central location/server 200 by, for example, entering the location and associated WAP MAC address into an application, such as the task management application 206.

In certain embodiments, the IT help desk receives tasks from one or more departments/locations, and the tasks are entered, either automatically or manually, into the task management application 206 to create the assigned task database 210. Moreover, in certain further embodiments, each task can also include priority information based on the type of task, the complexity, severity or urgency of the task, the end-user(s) involved, the importance the end-user places on the task, combinations of the same or the like. For example, replacing hardware may have a higher priority than fixing a software issue. In another example, one end-user may occupy a position of higher importance in the company hierarchy than other end-users also reporting IT tasks and may, as a result, have a higher priority than the other end-users.

FIG. 3 also illustrates an exemplary IT help desk assigned task database 310 stored on the IT help desk server 200, according to certain embodiments. In an embodiment, the assigned task database 310 comprises at least one task, at least one priority, and at least one location. In other embodiments, the assigned task database 310 further comprises information, such as, for example, the identity of who reported the problem to the help desk, the time of day of the report, the date and time of the report, a description of the problem, attached related documents, equipment used, asset tag information, and the like. The assigned task database 310 identifies each task, its associated priority, and its associated location. For example, the task management application 206 assigned Task 1 a priority of one and the repair is located in department/location B 102. The task management application 206 assigned Task 2 a priority of three and the repair is also located in department/location B 102. Finally, Task 3, located in department/location C 106, also has a priority of two, while Task 4, located in department/location D 108, has a priority of one.

In certain embodiments, the task management application 206 comprises a location-awareness prioritization-based task application 206, which uses the entries from the WAP database 208 as one of the properties of each task along with the other properties that assist to establish prioritization, as discussed above. Moreover, in certain embodiments, the location for each task can be assigned (e.g., automatically, by the user or by an administrator) as part of the inputting of the task using the task management application 206.

In certain embodiments, a remote user, such as, for example, a member of the help desk staff at a location remote to the server 200, uses the location information to determine a priority of one or more tasks to be completed by the remote user. For instance, in certain embodiments, the prioritization method is used in an environment including one or more remote users each having a portable computing device, for example, a laptop, a pager, a Smartphone, a cellular phone, PDA, or the like, that executes a client-side application for displaying open tasks to the particular remote user.

Figure 4:
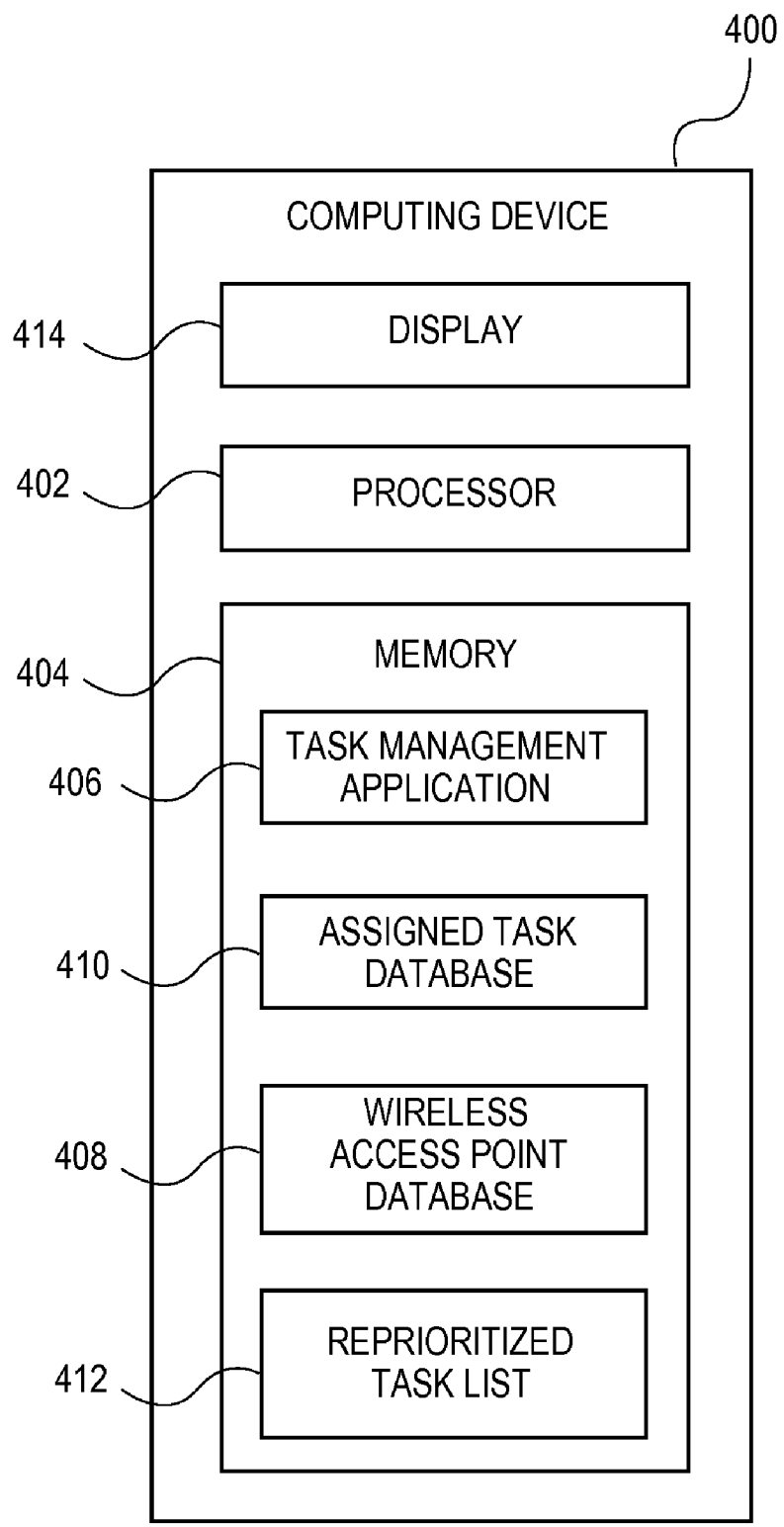
FIG. 4 illustrates an embodiment of a computing device.

FIG. 4 illustrates an embodiment of a remote user's computing device 400. The computing device 400 comprises one or more computers 402, memory 404, and a display 414. The computers 402 comprise, by way of example, processors, program logic, or other substrate configurations representing data and instructions, which operate as described herein. In other embodiments, the processors can comprise controller circuitry, processor circuitry, processors, general-purpose single-chip or multi-chip microprocessors, digital signal processors, embedded microprocessors, microcontrollers and the like.

The memory 404 can comprise one or more logical and/or physical data storage systems for storing data and applications used by the computing device 400. In an embodiment, the memory 404 comprises a task management application 406, a WAP database 408, an assigned task database 410, and a reprioritized task list 412.

Figure 5:
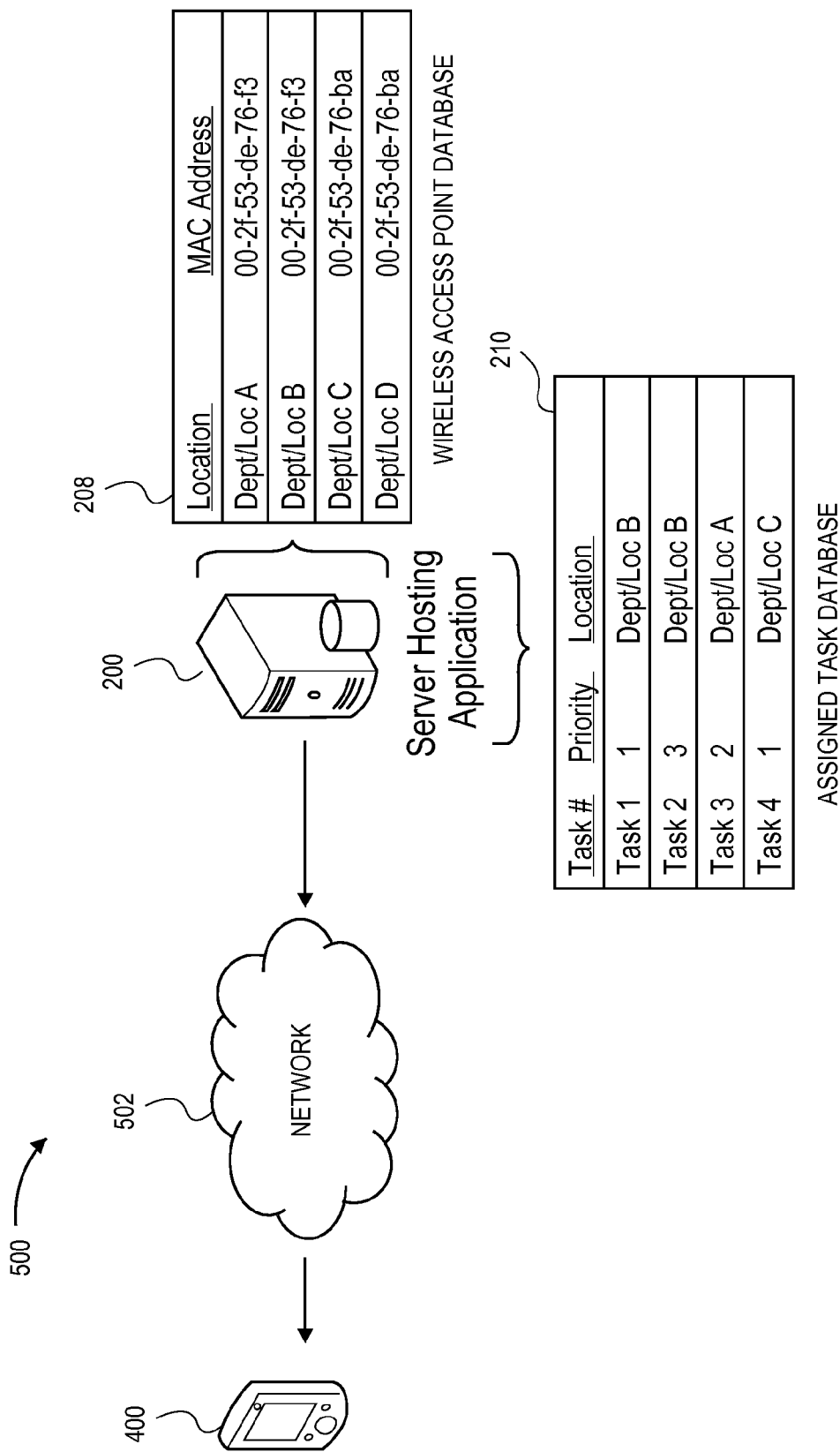
FIG. 5 illustrates a block diagram of an IT task management system, according to certain embodiments.
Figure 6:
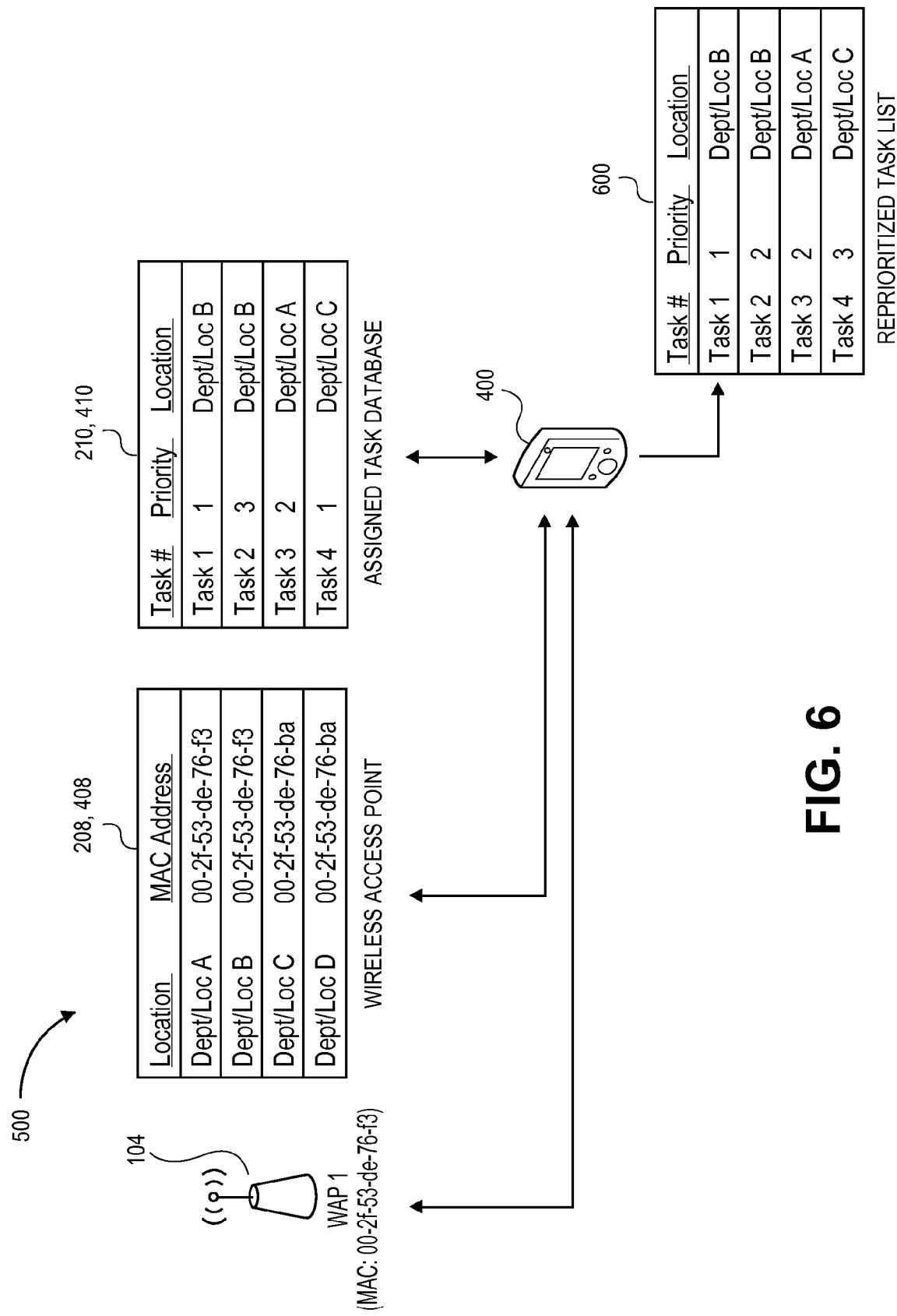
FIG. 6 illustrates a block diagram including further details of the IT task management system of FIG. 5, according to certain embodiments.

FIGS. 5 and 6 illustrate a block diagram of an IT help desk task management system 500, according to certain embodiments. Referring to FIG. 5, the IT help desk task management system 500 comprises the server 200 and at least one remote computing device 400. In an embodiment, the remote computing device 400 communicates through a network 502 to the server 200. The network 502 can be a private network or a public wide area network, such as the Internet. In other embodiments, the network 502 can be any communication system including by way of example, telephone networks, wireless data transmission systems, two-way cable systems, customized computer networks, interactive kiosk networks, interactive television networks, and the like. As shown in FIG. 6, the remote computing device 400 further communicates with the nearby WAP 104.

Figure 7:
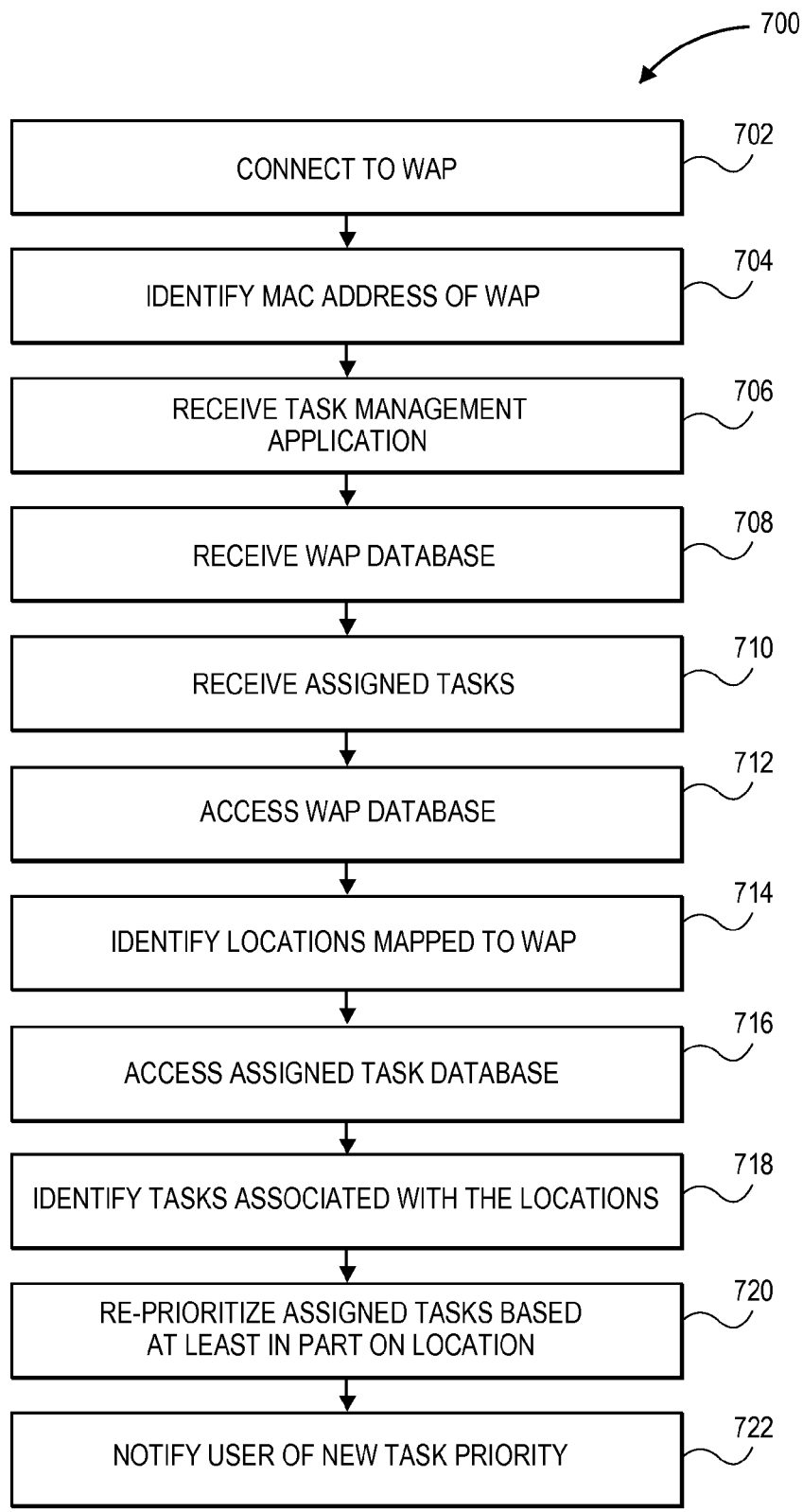
FIG. 7 illustrates a flowchart of an exemplary location-awareness prioritization process for the IT task management system of FIGS. 5 and 6.

FIG. 7 illustrates a flowchart of an exemplary location-awareness prioritization process 700 for prioritizing tasks based at least in part on location information. For example, IT help desk task management system 500 can use the location-awareness prioritization process 700 to dynamically prioritize IT help desk tasks based at least in part on location information. For exemplary purposes, the location-awareness prioritization process 700 will be described with reference to the components of the IT help desk task management system 500 of FIGS. 5 and 6.

The location-awareness prioritization process 700 begins at State 702. At States 702-704, the remote computing device 400 receives location information. In an embodiment, the remote computing device 400 connects to the nearby WAP 104 at State 702. When the remote computing device 400 connects to the nearby WAP 104, the remote computing device 400 notes the MAC address at State 704. For example, when the remote computing device 400 connects to the first WAP 104, the computing device 400 reads the MAC address 00-2f-53-de-76-f3.

In further embodiments, the remote computing device 400 receives location information as global positioning information from the nearby location 100, 102, 106, 108 having a global positioning system (GPS). In an embodiment, the remote computing device 400 connects to the nearby GPS system, and in State 704 receives the location information from the GPS system.

In yet further embodiments, the remote computing device 400 receives location information as radio frequency identification information (RFID) from the nearby location 100, 102, 106, 108 having an RFID device. In an embodiment, the remote computing device 400 connects to the nearby RFID device, and in State 704 receives the location information from the RFID device.

In State 706, the remote computing device 400 receives the task management application 206. In an embodiment, the remote computing device 400 accesses through the network 502 the task management application 206 stored on the server 200. In another embodiment, the computing device 400 retrieves the task management application 206 from the server 200 and stores it as the task management application 406 for use in determining the location based priority of the tasks.

At State 708, the remote computing device 400 receives the WAP database 208. In an embodiment, the remote computing device 400 accesses through the network 502 the WAP database 208 stored on the server 200. In another embodiment, the remote computing device 400 retrieves the WAP database 208 from the server 200 and stores it as the WAP database 408 for use in determining the priority of the tasks, based at least in part on the location of the task.

At State 710, the remote computing device 400 receives the assigned task database 210. In an embodiment, the remote computing device 400 accesses through the network 502 the assigned task database 210 stored on the server 200. In another embodiment, the remote computing device 400 retrieves the assigned task database 210 from the server 200 and stores it as the assigned task database 410 for use in determining the priority of the tasks, based at least in part on the location of the task.

In an embodiment, the location-awareness prioritization process 700 transforms the location information identified at State 704 into nearby assigned tasks. States 712-718 provide further details of the transformation, according to an embodiment.

At State 712, the task management application 406 accesses the WAP database 408, and, at State 714, identifies one or more locations 100, 102 mapped to the first WAP 104 using its MAC address. In another embodiment, at State 712, the computing device 400 accesses the task management application 206 on the server 200 and, at State 714, identifies one or more locations 100, 102 mapped to the first WAP 104 using its MAC address. In yet another embodiment, at State 712, the task management application 406 accesses the WAP database 208 on the server 200 and, at State 714, identifies one or more locations 100, 102 mapped to the first WAP 104 using its MAC address. In yet another embodiment, at State 712, the remote computing device 400 can prompt a remote user of the remote computing device 400 to associate a given location 100, 102 with the WAP 104 and, at State 714, the remote user inputs the association into the remote computing device 400.

In another embodiment, at State 712, the task management application 406 accesses the WAP database 408, and at State 714, identifies one or more locations associated with the GPS information. In another embodiment, at State 712, the computing device 400 accesses the task management application 206 on the server 200, and at State 714, identifies one or more locations 100, 102 associated with the GPS information. In yet another embodiment, at State 712, the task management application 406 accesses the WAP database 208 on the server 200 and, at State 714, identifies one or more locations 100, 102 associated with the GPS information.

In another embodiment, at State 712, the task management application 406 accesses the WAP database 408, and at State 714, identifies one or more locations 100, 102 associated with the RFID information. In another embodiment, at State 712, the computing device 400 accesses the task management application 206 on the server 200 and, at State 714, identifies one or more locations 100, 102 associated with the RFID information. In yet another embodiment, at State 712, the task management application 406 accesses the WAP database 208 on the server 200 and at State 714, identifies one or more locations 100, 102 associated with the RFID information.

At State 716, the remote computing device 400 accesses the assigned task database 410, and, at State 718, identifies one or more tasks (e.g., Tasks 1-3) associated with the location 100, 102 (e.g., department/location A and department/location B). In another embodiment, at State 716, the remote computing device 400 accesses the task management application 206 on the server 200 and, at State 718, identifies one or more tasks associated with the location 100, 102. In yet another embodiment, the task management application 406 accesses the assigned task database 210 on the server 200 at State 716, and identifies, at State 718, one or more tasks associated with the location 100, 102.

At State 720, in an embodiment, the computing device 400 re-evaluates the order or the priority of the assigned tasks, based at least in part, on the location information. At State 720, in another embodiment, the computing device 400 dynamically re-evaluates the order or the priority of the assigned tasks, based at least in part, on the current location of the remote user. For example, the remote computing device 400 can notify the IT help desk staff member to attend to IT tasks in the same area to avoid inefficient back and forth travel between multiple departments/locations.

In another embodiment, the remote computing device 400 reassess the priority of the tasks in the assigned task database 408 to include the location of the remote user to create the reprioritized task list 412. For example, the initial priorities assigned to the tasks in the assigned task database 210, 410 may not have taken into consideration the location of the remote user. Once the remote computing device 400 identifies the location of the remote user using, for example, the MAC address of the nearby WAP, global positioning information, RDIF data from a nearby RFID device, or the like, the remote computing device 400 can re-evaluate the priority of the assigned tasks, based at least in part on the location information. Dynamically re-evaluating the priority of the assigned tasks to include location information increases the efficiency of the remote user assigned to resolve the open issues. Table 1 comprises a non-exhaustive list of factors that can be considered in re-evaluating the priority of the assigned tasks.

TABLE 1

| Task Prioritization Factors |
| --- |
| Location of the Remote User |
| Location of the End-User |
| Type of Task |
| Complexity of Task |
| Urgency of Task |
| Severity of Task |
| Importance the End-User Places on the Task |
| Importance of the End-User Involved |

In certain embodiments, the remote user is given the opportunity to reprioritize or re-order the assigned tasks. For example, the task management application 206, 406 can suggest to the remote user that assigned task database 201, 410 be reprioritized based, at least in part, on the location of the remote user. In other embodiments, the task management application 206, 406 mandates that assigned task database 201, 410 be reprioritized based, at least in part, on the location of the remote user. For example, the task management application 206, 406 automatically reprioritizes or re-orders the assigned task database 201, 410 based, at least in part, on location information and automatically notifies the remote user of the reprioritized task list 412.

Referring to FIG. 6 and State 720, the remote computing device 400 reprioritizes the assigned task database 210, 410 to create the exemplary reprioritized assigned task list 600. In an embodiment, the remote computing device 400 identifies locations 100, 102 associated with or mapped to the unique MAC address of WAP 104 using the WAP database 208, 408. Then, the remote computing device 400 correlates the identified locations 100, 102 with Tasks 1, 2, and 3 using the assigned task database 210, 410, transforming the location information into assigned tasks. Next, the location-aware remote computing device 400 creates the exemplary reprioritized task list 600.

As illustrated in FIG. 6, the priority of Tasks 2 and 3 has changed, based at least in part on the location of the remote user. Task 2, originally having a priority of three as shown in the assigned task database 210, 410, has been revised. Task 2 in the exemplary reprioritized task list 600 has a priority of two. Likewise, the priority of Task 4 has been revised from a priority of one in the assigned task database 210, 410 to a priority of three in the exemplary reprioritized task list 600.

Finally, at State 722, the remote computing device 400 optionally notifies the remote user of the new task priorities. The notification can be on the display 414, from a printout, audibly, in any combination, or the like.

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of dynamically reprioritizing an information technology (IT) task database, the method comprising:
  receiving from a server a wireless access point (WAP) database, wherein the WAP database comprises at least one access address, the at least one access address associated with at least one first location;
  receiving from the server a task database, wherein the task database comprises at least one task, wherein the at least one task is assigned to the task database by an IT administrator, the at least one assigned task having a first priority and associated with a physical location;
  connecting to a WAP at a current location;
  identifying an access address associated with the WAP at the current location;
  transforming the current location access address into the at least one assigned task; and
  reprioritizing the assigned tasks in the task database based at least in part on the current location, wherein the reprioritized task database comprises the at least one assigned task, the at least one assigned task having a second priority, wherein the second priority is different from the first priority.

2. The method of claim 1, wherein the access address comprises a media access control (MAC) address, wherein identifying an access address associated with the WAP at the current location comprises identifying a MAC address associated with the WAP at the current location, and wherein transforming the current location access address into the at least one assigned task comprises transforming the current location MAC address into the at least one assigned task.

3. The method of claim 2, wherein transforming the current location MAC address into the at least one assigned task comprises:
   using the current location MAC address as the at least one access address in the WAP database;
   identifying the at least one first location using the WAP database and the current location MAC address;
   using the at least one first location as the physical address associated with the at least one assigned task in the assigned task database; and
   identifying the at least one assigned task using the task database and the at least one first location.

4. The method of claim 1, wherein the second priority is determined using a plurality of factors, wherein the plurality of factors comprises the current location.

5. The method of claim 1, wherein the current location is defined, at least in part, by the signal strength of the WAP.

6. The method of claim 1, wherein connecting to the WAP comprises associating the WAP with the at least one first location in closest proximity to the WAP.

7. The method of claim 1, wherein reprioritizing the tasks in the task database comprises reordering the tasks in the task database based at least in part on the current location.

8. A computer readable storage medium comprising computer executable instructions configured to implement a method of dynamically reprioritizing an information technology (IT) task database, the method comprising:
   receiving from a server a wireless access point (WAP) database, wherein the WAP database comprises at least one access address, the at least one access address associated with at least one first location;
   receiving from the server a task database, wherein the task database comprises at least one task, wherein the at least one task is assigned to the task database by an IT administrator, the at least one assigned task having a first priority and associated with a physical location;
   connecting to a WAP at a current location;
   identifying an access address associated with the WAP at the current location;
   transforming the current location access address into the at least one assigned task; and
   reprioritizing the assigned tasks in the task database based at least in part on the current location, wherein the reprioritized task database comprises the at least one assigned task, the at least one assigned task having a second priority, wherein the second priority is different from the first priority.

9. The computer readable storage medium of claim 8, wherein the access address comprises a media access control (MAC) address, wherein identifying an access address associated with the WAP at the current location comprises identifying a MAC address associated with the WAP at the current location, and wherein transforming the current location access address into the at least one assigned task comprises transforming the current location MAC address into the at least one assigned task.

10. The computer readable storage medium of claim 9, wherein transforming the current location MAC address into the at least one assigned task comprises:
   using the current location MAC address as the at least one access address in the WAP database;
   identifying the at least one first location using the WAP database and the current location MAC address;
   using the at least one first location as the physical address associated with the at least one assigned task in the assigned task database; and
   identifying the at least one assigned task using the task database and the at least one first location.

11. The computer readable storage medium of claim 8, wherein the second priority is determined using a plurality of factors, wherein the plurality of factors comprises the current location.

12. The computer readable storage medium of claim 8, wherein the current location is defined, at least in part, by the signal strength of the WAP.

13. The computer readable storage medium of claim 8, wherein the current location is defined, at least in part, by the proximity of the WAP.

14. The computer readable storage medium of claim 8, wherein reprioritizing the task database comprises reordering the task database based at least in part on the current location.

* * * * *